US007035829B2

(12) United States Patent
Morimoto

(10) Patent No.: US 7,035,829 B2
(45) Date of Patent: Apr. 25, 2006

(54) SYSTEM AND METHOD FOR PROVIDING TEMPORARY ACCESS TO CONTENT DURING SHIPPING

(76) Inventor: Nobuyoshi Morimoto, 12 Fl., No. 167, Fu-Hsin N. Rd., Taipei (TW) 105

( * ) Notice: Subject to any disclaimer, the term of this patent is extended or adjusted under 35 U.S.C. 154(b) by 663 days.

(21) Appl. No.: 10/133,991

(22) Filed: Apr. 26, 2002

(65) Prior Publication Data
US 2002/0169689 A1 Nov. 14, 2002

Related U.S. Application Data

(60) Provisional application No. 60/286,882, filed on Apr. 26, 2001.

(51) Int. Cl.
*G06F 17/60* (2006.01)

(52) U.S. Cl. ........................................... 705/51; 705/26

(58) Field of Classification Search ................ 705/16, 705/22, 26–29, 51–54, 59, 75; 713/155, 713/165–169; 380/201–203; 707/9–10, 707/205
See application file for complete search history.

(56) References Cited

U.S. PATENT DOCUMENTS

| 4,799,156 | A | 1/1989 | Shavit et al. |
| 5,015,145 | A | 5/1991 | Angell et al. |
| 5,038,283 | A | 8/1991 | Caveney |
| 5,063,506 | A | 11/1991 | Brockwell et al. |
| 5,117,096 | A | 5/1992 | Bauer et al. |
| 5,123,541 | A | 6/1992 | Giannini et al. |
| 5,261,282 | A | 11/1993 | Grabowski et al. |
| 5,413,236 | A | 5/1995 | Kenevan |
| 5,466,030 | A | 11/1995 | Harris et al. |
| 5,522,471 | A | 6/1996 | Hilgendorf |
| 5,565,858 | A | 10/1996 | Guthrie |
| 5,627,517 | A | 5/1997 | Theimer et al. |
| 5,629,980 | A * | 5/1997 | Stefik et al. ................ 705/54 |
| 5,666,493 | A | 9/1997 | Wojcik et al. |

(Continued)

FOREIGN PATENT DOCUMENTS

DE 44 46 203 6/1996

(Continued)

OTHER PUBLICATIONS

Keith et al., "The MMA's White Paper on Network Software Licensing", InfoWorld, v13n41, pp 46, 50-52, Oct. 14, 1991, ISSN: 0199-6649.*

(Continued)

*Primary Examiner*—Mary D. Cheung
(74) *Attorney, Agent, or Firm*—Robert C. Kowert; Meyertons, Hood, Kivlin, Kowert & Goetzel, P.C.

(57) ABSTRACT

A system and method for providing temporary access to content during shipping. In one embodiment, the system may include a retail web site configured to allow a user to purchase one or more content items via the Internet. The system may also include a temporary content server storing digital copies of at least a portion of at least a subset of the one or more content items. A network interface may be used to connect the temporary content server to the Internet. The temporary content server may be configured to provide the user with temporary access to selected portions of the stored digital copies. The selected portions correspond to the content items purchased by the user. The temporary content server is configured to prevent the user from accessing the stored digital copies once the server has detected that the user has received the ordered content items.

41 Claims, 10 Drawing Sheets

U.S. PATENT DOCUMENTS

| | | | |
|---|---|---|---|
| 5,686,888 A | 11/1997 | Welles, II et al. | |
| 5,712,788 A | 1/1998 | Liaw et al. | |
| 5,715,398 A | 2/1998 | Lubenow et al. | |
| 5,765,707 A | 6/1998 | Kenevan | |
| 5,804,810 A | 9/1998 | Woolley et al. | |
| 5,949,876 A | 9/1999 | Ginter et al. | |
| 5,959,568 A | 9/1999 | Woolley | |
| 6,073,124 A * | 6/2000 | Krishnan et al. | 705/59 |
| 6,099,047 A | 8/2000 | Reiff et al. | |
| 6,115,695 A | 9/2000 | Kern | |
| 6,128,549 A | 10/2000 | Swartz et al. | |
| 6,151,582 A | 11/2000 | Huang et al. | |
| 6,199,046 B1 | 3/2001 | Heinzle et al. | |
| 6,233,682 B1 * | 5/2001 | Fritsch | 713/168 |
| 6,236,971 B1 | 5/2001 | Stefik et al. | |
| 6,321,992 B1 | 11/2001 | Knowles et al. | |
| 6,332,098 B1 | 12/2001 | Ross et al. | |
| 6,356,802 B1 | 3/2002 | Takehara et al. | |
| 6,398,109 B1 | 6/2002 | Ohki | |
| 6,429,810 B1 | 8/2002 | De Roche | |
| 6,460,020 B1 | 10/2002 | Pool et al. | |
| 6,463,420 B1 * | 10/2002 | Guidice et al. | 705/28 |
| 6,496,802 B1 * | 12/2002 | van Zoest et al. | 705/14 |
| 6,696,918 B1 * | 2/2004 | Kucharczyk et al. | 340/5.21 |
| 6,847,942 B1 * | 1/2005 | Land et al. | 705/30 |
| 2001/0042048 A1 * | 11/2001 | Boykin et al. | 705/51 |
| 2001/0043273 A1 | 11/2001 | Herrod et al. | |
| 2003/0183697 A1 | 10/2003 | Porter | |

FOREIGN PATENT DOCUMENTS

| | | |
|---|---|---|
| DE | 198 13 842 | 9/1999 |
| GB | 2 371 895 | 8/2002 |
| JP | 5-242106 | 9/1993 |
| JP | 2001-171811 | 6/2001 |
| JP | 2001-253517 | 9/2001 |
| JP | 2002318927 A * | 10/2002 |
| WO | 96/13015 | 5/1996 |
| WO | 99/23623 | 5/1999 |
| WO | 01/09864 | 2/2001 |

OTHER PUBLICATIONS

"MSR Visual Exporter: Premium Global Export Software," 6 pgs., © 2001 MSR International, Inc.

Kumar et al., "Building the 'last mile' - how to solve logistics conflicts in e-business," © European Business Forum Limited 2000, pp. 66-70.

"Yusen Air & Sea Services (USA), Inc.," © 2001 Yusen Air & Sea Services Co., Ltd., pp. 1-6.

"FedEx Tracking," © 1995-2001 FedEx, pp. 1-2.

"UPS Handheld Solutions," © 1994-2000 United Parcel Service of America, Inc., pp. 1-2.

"UPS Shipping and Tracking Solutions," © 1994-2000 United Parcel Service of America, Inc., pp. 1-3.

"UPS OnLine WorldShip," © 1994-2000 United Parcel Service of America, Inc., pp. 1-4.

"UPS OnLine Host Access," © 1994-2000 United Parcel Service of America, Inc., pp. 1-2.

"UPS OnLine Compatible Solutions," © 1994-2000 United Parcel Service of America, Inc., pp. 1-4.

"Intrepa Products & Services," © 2000 Intrepa LLC, pp. 1-3.

"Shipment Packaging Software from Cargoware," © 1999 Cargoware, pp. 1-2.

Stenmark, "Information agents for the web," Feb. 1998, 2 pgs.

"Amazon.com Opens Must Store, Provides a Whole New Way to Discover Music," Amazon.com Investor Relations, Press Release, Jun. 11, 1998, 2 pages.

"Seybold: Vyou.com Delivers Digital Rights Solutions," Dennis Sellers, MacCentral Online, Aug. 29, 2000, 1 page.

International Search Report for GB 0209490.2 mailed Dec. 18, 2002, 5 pages.

* cited by examiner

SYSTEM AND METHOD FOR PROVIDING TEMPORARY ACCESS TO CONTENT DURING SHIPPING

CROSS-REFERENCE TO RELATED APPLICATIONS

This application claims the benefit of U.S. Provisional Application No. 60/286,882, filed Apr. 26, 2001.

BACKGROUND OF THE INVENTION

1. Field of the Invention

The present invention generally relates to providing temporary access to content. More particularly, the present invention relates to managing access to content on a temporary basis.

2. Description of the Related Art

Internet commerce has become an increasingly popular form of commerce in the United States and throughout the world. In general, Internet-based commerce, often referred to as e-commerce, provides advantages to both suppliers and consumers. E-commerce provides vendors and service providers the ability to greatly increase their sales channel and distribution network with minimal cost. An Internet commerce site provides a convenient, effective, and secure mechanism for potential buyers to browse, select, and purchase goods or services in an easy and simple fashion.

One class of sites that have seen a tremendous increase in popularity online are so-called "e-tailers". E-tailers are retail stores that sell products via the Internet and world wide web ("the web"). One particularly popular example of an online retailer is amazon.com®. Many e-tailers have been particularly successful selling items such as books, video tapes, compact disks, DVDs, and computer software (collectively referred to herein as "content" or "content items").

While e-tailers provide customers with the convenience of shopping online, they also suffer some drawbacks when compared with traditional "brick-and-mortar" stores. One such disadvantage is the time that the customer must wait to receive the goods purchased. If the customer is anxious to begin enjoying an item she is about to purchase, the customer is unlikely to use an e-tailer. Instead, the customer is more likely to go to her local brick-and-mortar retailer to purchase the item and begin enjoying it immediately. This problem is particularly keen with impulse purchases such as entertainment items and content items. For example, a customer may hear a song on the radio and decide to purchase that song. Once the purchasing decision has been made, most customers would like to listen to the compact disk immediately it is likely that the customer will want to listen to compact disk as soon as possible. Similarly, a person buying a book is likely to want to begin to read the book as soon as possible. Currently, the only alternative to brick-and-mortar stores for "instant" gratification is to pay higher shipping fees to reduce the wait by a few days. Since shipping costs may already be prohibitive for relatively inexpensive products such as content items, this is not always a satisfactory solution.

Thus, as system and method for reducing the amount of time a purchaser must wait to enjoy content items once they are purchased is desired.

SUMMARY OF THE INVENTION

A system and method may be implemented to provide users with temporary access to content items via a computer network. In one embodiment, a method may include detecting that a user has purchased a particular content item via a computer network. Next, the user may be provided with temporary online access to an online copy of at least part of the content item. In parallel, the item may be shipped to the user using traditional freight carriers. Once the user has received the content item, this receipt may be detected, and the user's access to the online copy of the content item may be deactivated. In one embodiment, the user's receipt of the content item may be detected by periodically querying an Internet website providing package tracking information. In some embodiments, a password may be issued to the user. The user may be required to provide the password in order to access the on-line copy of the content item (e.g., via a password-protected website on the Internet). This password may be deactivated once the user has received the actual content item. In some embodiments, the password may be deactivated a daily basis (i.e., thus requiring the user to re-apply for a password each day). In other embodiments, the password may only be valid for a predetermined amount of time (e.g., commensurate with the estimated shipping time). In some embodiments, the user may be required to register the content item once it is received. For example, in order to activate the warranty or in order to obtain a rebate, the user may be required to register using an online web form. The content server may be configured to detect this registration and thereby cease providing access to the copy of the content.

The methods outlined herein may be used with a variety of content including, for example, text such as books or magazines, images such as photographs, videos, audio files, and software programs. In some embodiments, only a portion of the ordered content may be provided online. For example, a particular chapter may be offered online in lieu of offering an entire book. Similarly, one song may be offered online in lieu of offering an entire compact disk. Furthermore, the online content may be provided in a lower quality format than that of the actual purchased content item. For example, the audio files provided via the temporary online access may be of a lower resolution (e.g., MP-3 files versus higher quality compact disk audio files). Digital video files may also be provided in a streaming format and at a lower quality in order to prevent most users from making commercially redistributable copies of the video files.

In some embodiments, electronic stamps (i.e., electronic communications devices) may be attached to the shipped content item. Advantageously, the electronic stamp may be configured to communicate with a remote server that is hosting the temporary content. Advantageously, the server may be configured to detect communications from the electronic stamp and in response thereto deactivate access to the temporary content.

In one embodiment, the system that provides temporary access to the online content (i.e., while the purchased content item is being shipped) may include a retail website configured to allow users to purchase one or more content items via the Internet. The system may also include a temporary content server that stores digital copies of at least a portion of the one or more content items. The system may further include a network interface connecting the temporary content server to the Internet. The temporary content server may be configured to provide the user with temporary access to selected portions of the stored content. The selected portions may correspond to the one or more content items purchased by the user. In some embodiments, the retail website may be configured to issue the user a password that allows access the to the temporary content. The temporary content server may also be configured to deactivate the password in response to detecting that the user has received the ordered content item. The content server may be configured with a registration web page that requires the user to register upon receipt of the shipped content item.

BRIEF DESCRIPTION OF THE DRAWINGS

Other aspects of the invention will become apparent upon reading the following detailed description and upon reference to the accompanying drawings in which.

Figure 1:
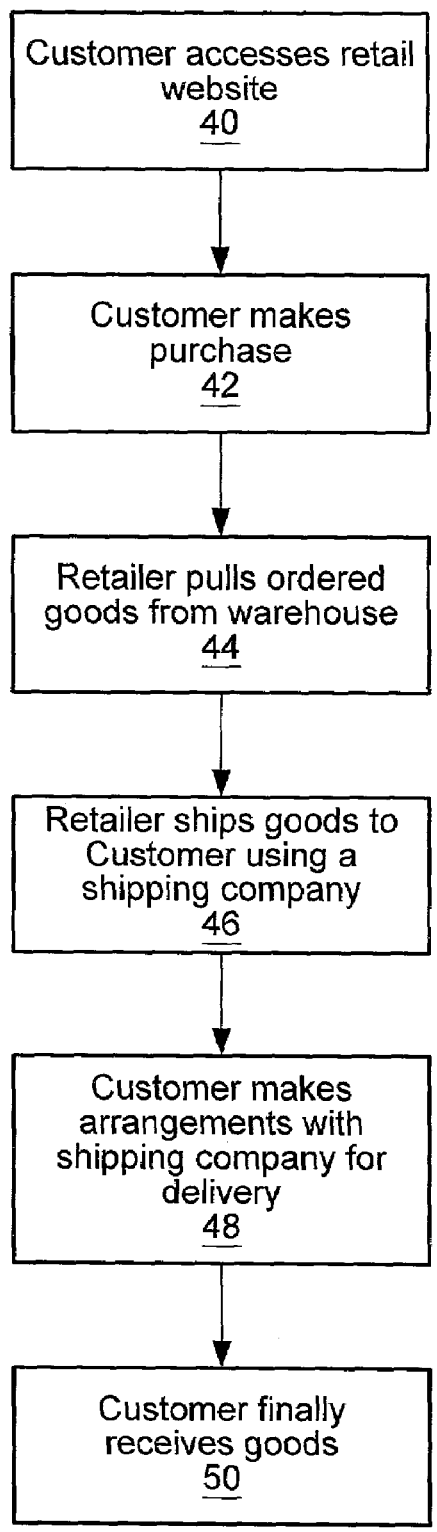
FIG. 1 is diagram depicting one embodiment of a prior art system for providing content items to a customer purchasing the item via the Internet.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims.

DETAILED DESCRIPTION OF EMBODIMENTS

Turning now to FIG. 1, one embodiment of a prior art method for providing customers with access to purchased items is shown. First, a customer accesses a retail website to peruse the website's offerings (40). For example, customers may enter the amazon.com® website and browse the website's offerings until they find a particular book or video that they are interested in purchasing. Once the customer has selected a particular item, the customer may be presented with an opportunity to purchase the item. For example, an "add to shopping cart" icon may be displayed on the web page along with an image of the item. Once the item has been added to the shopping cart, the customer may "checkout" to complete the purchase (42).

Once the customer has made his or her purchase, the retailer may be configured to process the order. For example, the retail website may be configured to transmit an email message to the retailer's warehouse that instructs the warehouse staff to pull the ordered goods from the warehouse shelves (44). Next, the retailer may ship the goods to the customer using any one of a number of different shipping companies (46). In some cases, the shipping company may be unable to reach the customer or leave the item unattended (e.g., in cases when a customer's signature is needed to verify delivery of the item for insurance purposes). In these cases, the customer must make arrangements with the shipping company for delivery (48). Once arrangements have been made, the customer may finally receive the goods (50).

As this example illustrates, in some cases it may be quite some time before the customer actually receives the item ordered. For example, delays in shipping or in delivery to the customer may add to the standard shipping times. Additional delays may result from the purchased item being backordered. As previously noted, in many cases customers ordering content items from a retail website may be particularly anxious to have the benefit of the items that have been ordered (e.g., having access to entertainment such as a movie or a video that has been ordered).

Figure 2:
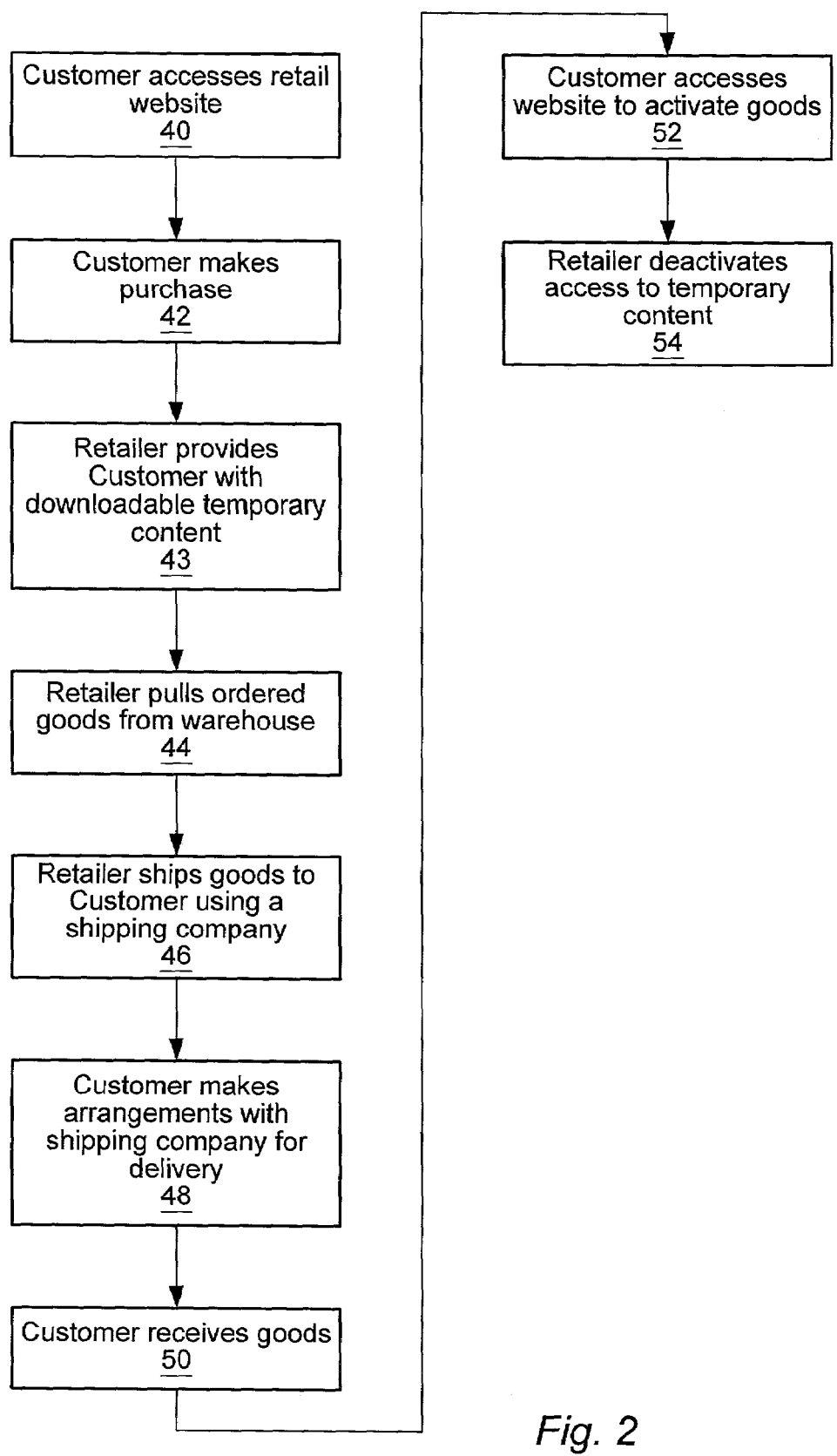
FIG. 2 is a flowchart of one embodiment of a method for providing a customer with temporary access to content.

Turning now to FIG. 2, one embodiment of a method for providing temporary access to content items while the items themselves are being shipped is shown. In this embodiment, the customer accesses the retail website as previously described above (40). Next, the customer may browse the retail website and make a selection for purchase (42). Next, the retailer may provide the customer with a downloadable version of the product for temporary use (43). The downloadable temporary product may "bridge the gap" in order to provide the customer with use of the purchased item while the item itself is en route.

Once the customer has the temporary product, the customer may enjoy the temporary product while the retailer pulls the ordered goods from the warehouse (44) and ships the goods to the customer using a shipping company (46) and while the shipping company makes arrangements with the customer for delivery (48).

Once the customer has received the goods (50), the customer may be required to access the retail website (or a different website associated with the original retail website) in order to activate the received goods (52). For example, for software products, a registration number may be issued to activate the software. In response to the customer accessing the website, the retailer may be configured to deactivate access to the temporary goods (54).

Note, the method illustrated in FIG. 2 may be implemented using a number of different techniques. For example, the method may be implemented in software configured to execute over a computer network. In one embodiment, the retail website may be implemented as a combination of HTML code and perl scripts that are configured to search a database of available products and then display results to the user via a web interface. Similarly, temporary content may be formed using a combination of data files and server software programs. For example, in one embodiment the temporary content that is provided to the user may be an encrypted text file of a chapter of a purchased book. The content may include a software component that is configured to decrypt and display the text. Additional details of several embodiments are described below in connection with FIGS. 7A and 7B.

Figure 3:
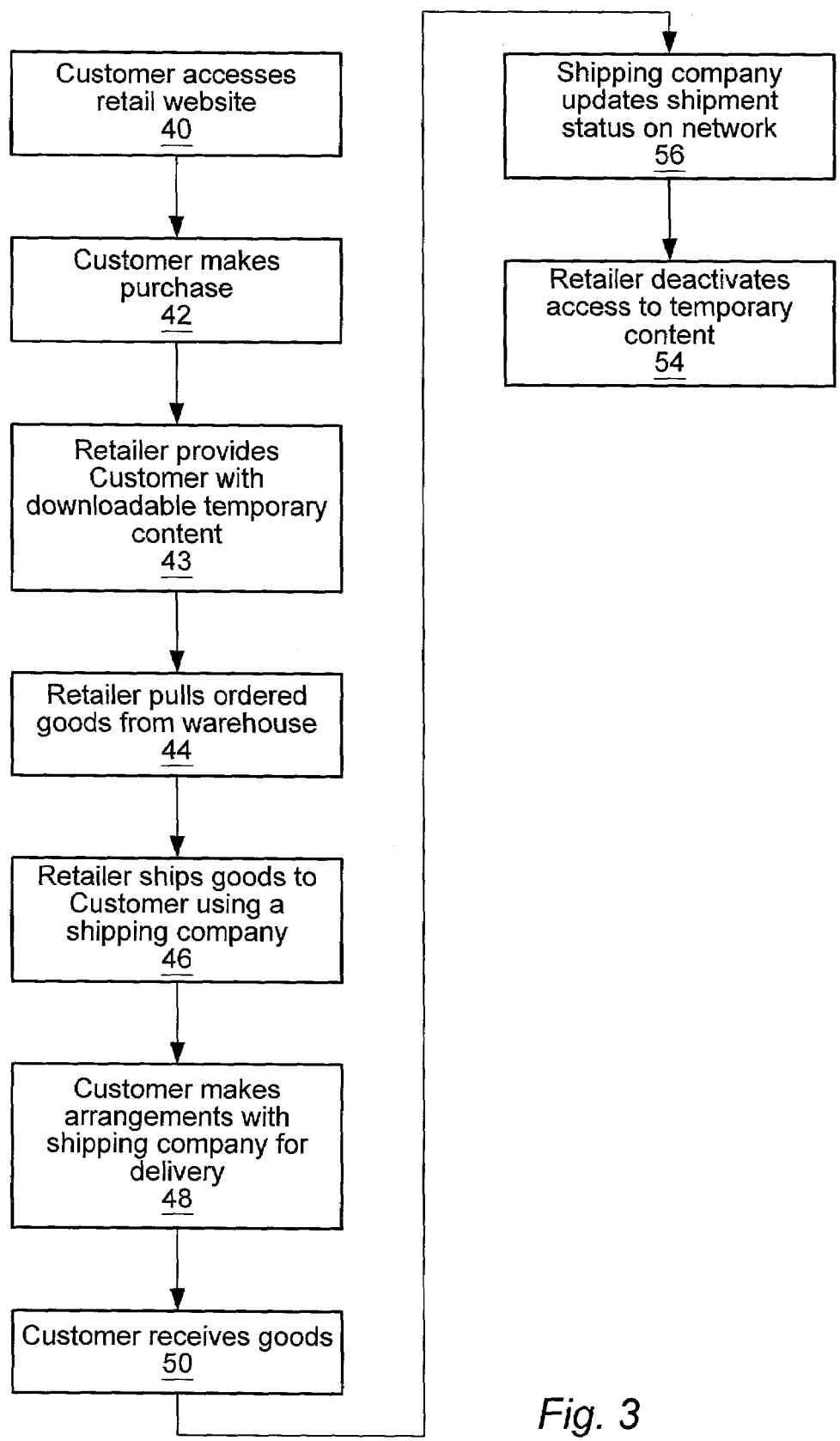
FIG. 3 is a flowchart of one embodiment of a method for providing a customer with temporary access to content.

Turning now to FIG. 3, another embodiment of a method for providing customers with temporary access to purchased content while they are waiting for shipment of a purchased item is shown. As with the previous embodiment, initially a customer accesses a retail website (40). The customer may browse the retail website and eventually make a purchase decision (42). The retail website may be configured to allow the customer to temporarily access (e.g., download) a portion of the content from the purchased item (43). In response to the purchase, the retailer may be configured to pull the ordered goods from one or more warehouses (44). As noted in the figure, the retailer may be configured to ship the goods to the customer (46).

As previously noted, significant delay may be involved in shipping the ordered goods to the customer depending on the distance from the warehouse to the customer and the retailer's warehouse configuration. Once the ordered goods arrive in the vicinity of the customer, the shipping company may contact the customer to make arrangements for delivery (48). Alternatively, the shipping company may simply deliver the goods to the customer. In some embodiments, once the customer receives the item (50) the shipping company may be configured to electronically note the delivery of the item and the proper receipt of the item by the customer (56). For example, UPS® (United Parcel Service®) provides its delivery drivers with an electronic device that records the customer's signature electronically and transmits this information to a server which is accessible via the Internet (in a service referred to as UPS Online®). This system allows users to determine if and when a particular package has been delivered. This or similar systems may be used by retailers implementing some embodiments of the systems and methods described herein to determine when to deactivate access to the temporary goods (54). For example, a retailer's website may be configured to periodically query the shipping company's website to determine if and when a particular customer has received the ordered item. In response to determining that an order has been received, the retailer website may deactivate any passwords that are issued to the customer for use in accessing the temporary goods.

For example, in one embodiment a customer may purchase a book from an online retail website. After the consumer's credit card information is verified for payment, the website may provide the customer with a password. The password may be usable to access a temporary content server associated with the retail website. The temporary content server may have selected chapters of the purchased book in an online digital format. Once the user receives the ordered book, the delivery will be noted on the delivery company's server. The retail website may be configured to query the delivery company's website on a daily basis and thus determine that the ordered book has been received. In response thereto, the retail website may deactivate the customer's password, thereby preventing the customer from further access to the electronic chapters of the book stored on the temporary content server.

In some embodiments, the temporary content may be provided in particular formats that prevent or make it difficult for the customer to make copies. For example, video content may be provided in a streaming format (e.g., using RealNetwork's RealPlayer® video application). Many of these formats prevent or make it difficult for users to make unauthorized copies of the downloaded content. In another embodiment, access to text files (e.g., chapters of a purchased book) may be provided as an array of small image files (e.g., JPEG or GIF formats). This may make it somewhat more difficult for users to make copies or easily forward the chapters to other users. While it is difficult to insure that no copying whatsoever will take place, it may nevertheless be desirable to prevent the majority of users from being able to easily make copies of the temporary content.

In one embodiment, hardware may be included with the shipped goods in order to notify the retailer that the shipped goods have been received. For example, in one embodiment an "electronic stamp" with a wireless transmitter may be included with the package shipped to the customer. Upon opening the package, the wireless transmitter may be configured to communicate with the retailer's website in order to notify the retailer's website to deactivate the password issued to the customer.

Figure 4:
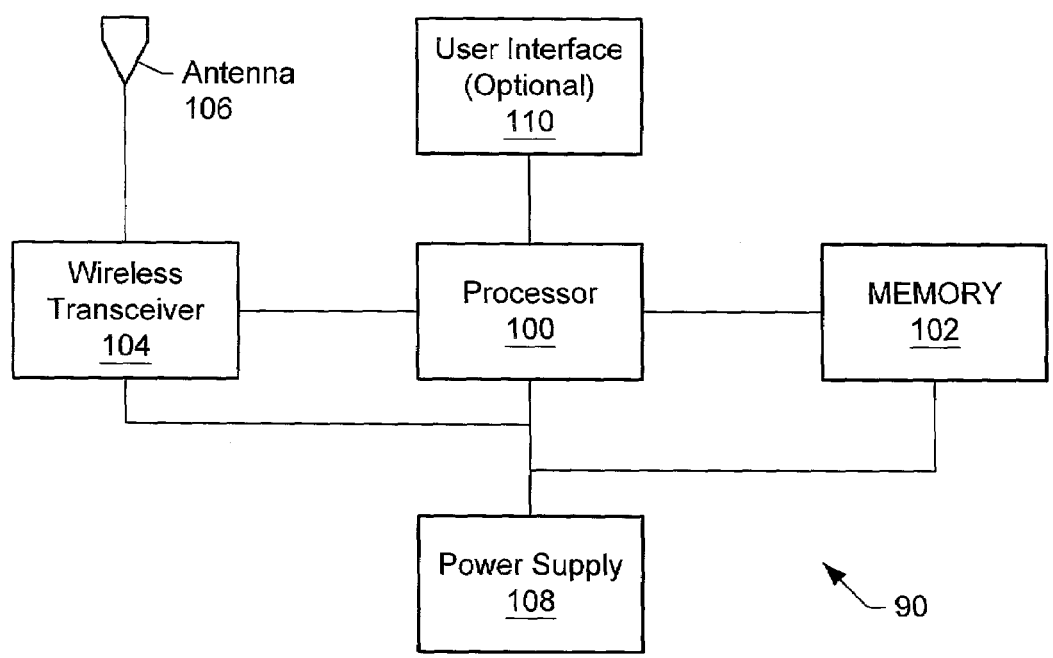
FIG. 4 is a diagram depicting one embodiment of an electronic stamp that may be used to implement one embodiment of a system or method for providing a customer with temporary access to content.

Turning now to FIG. 4, a diagram of one embodiment of such hardware is illustrated. In this embodiment, the hardware device 90 includes a processor 100, a memory 102, a power supply 108, a wireless transceiver 104, and an antenna 106. Different hardware configurations may be possible, and one embodiment processor 100 may be a microcontroller that includes internal memory 102. Power supply 108 may be a simple battery or a solar cell. Wireless transceiver 104 may be connected to a dipole antenna 106 to allow the hardware device to communicate with the retailer's website (e.g., via WAP—wireless access protocol). In some embodiments, hardware device 90 may also include a user interface 110. For example, the device may be configured with an LED or LCD display and a keyboard or touch screen that allows the user to communicate with the retail website. In one embodiment, the user may be required to enter selected order information using the user interface 110 in order to obtain a password that activates the received item or items. Hardware device 90 may be configured to communicate with the retail web server, thus ensuring that the retail web server has the opportunity to deactivate any passwords that were issued to the customer for access temporary content.

Figure 5:
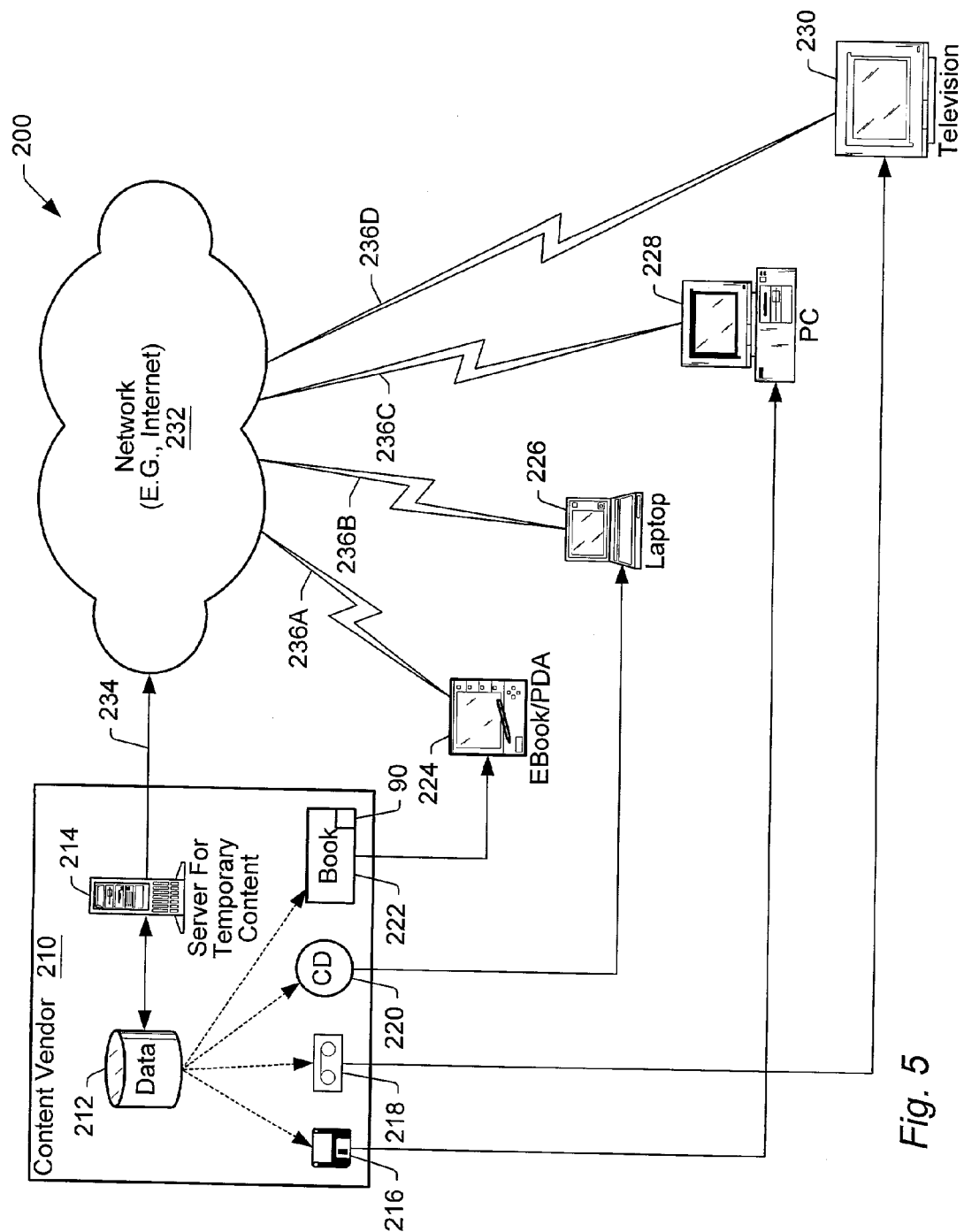
FIG. 5 is a diagram depicting one embodiment of a system for providing a customer with temporary access to content.

Turning now to FIG. 5, one embodiment of a system 200 for providing temporary access to content is shown. In this embodiment, system 200 includes a server 214 for providing access to temporary content via a computer network 232 (e.g., the Internet). As shown in the figure, server 214 may be connected to network 232 via a network interface 234 (e.g., a cable modem, DSL, or T1 connection). Server 214 provides access to a database of temporary content 212 via network connection 234. As noted above, the temporary content may include such diverse media formats as audio files (e.g., ".mp3" files, ".wav" files, ".snd" files) video files (e.g., ".avi", ".mpeg" files, RealMedia® files, QuickTime® files), text files, or executable files (e.g., software programs). As shown in the figure, the content in database 212 may be copies (e.g., partial or lower-resolution versions) of the content items actually shipped or sold by content vendor 210 (e.g., software programs 216, video tapes 218, compact disks and DVD's 222, and printed books 222).

As shown in the figure, customers may access the temporary content via computer network 232 using a variety of different Internet access tools (e.g., an electronic book or PDA—personal digital assistant 224, a laptop computer 226, a personal computer 228, or an Internet appliance or web-enabled television 230). These different Internet access tools may be connected to the Internet using a variety of connections (e.g., connections 236A through 236D) such as wireless connections, dial-up telephone connections, cable modem connections, DSL connections, or T1 connections.

As shown in the figure, once the user receives the content item shipped from the content vendor 210, the content item may be configured to cause the Internet access tool to connect to the network and thereby communicate with the temporary content server 214. For example, a user may purchase a compact disk with computer software on it (e.g., CD 220). Upon receiving the CD, the user may insert the CD into their laptop computer 226. The software on the compact disk may be configured to cause laptop computer 226 to access Internet 232 via network connection 236B. Using this network connection, laptop computer 226 may be configured to communicate with content vendor 210's server 214. In response thereto, server 214 may be configured to deactivate any passwords that were previously issued to the user to provide access to the temporary content in database 212. As shown in the figure, each Internet access device may also be used by the customer to access the temporary content in database 212 through temporary content server 214 via the network 232 and network connections 236A through 236D while the password is in effect.

As noted above, in some embodiments the shipped items 216 through 222 may be configured with a hardware mechanism 90 that is configured to automatically communicate with temporary content server 214 in order to deactivate any passwords issued to the customer.

Figure 6:
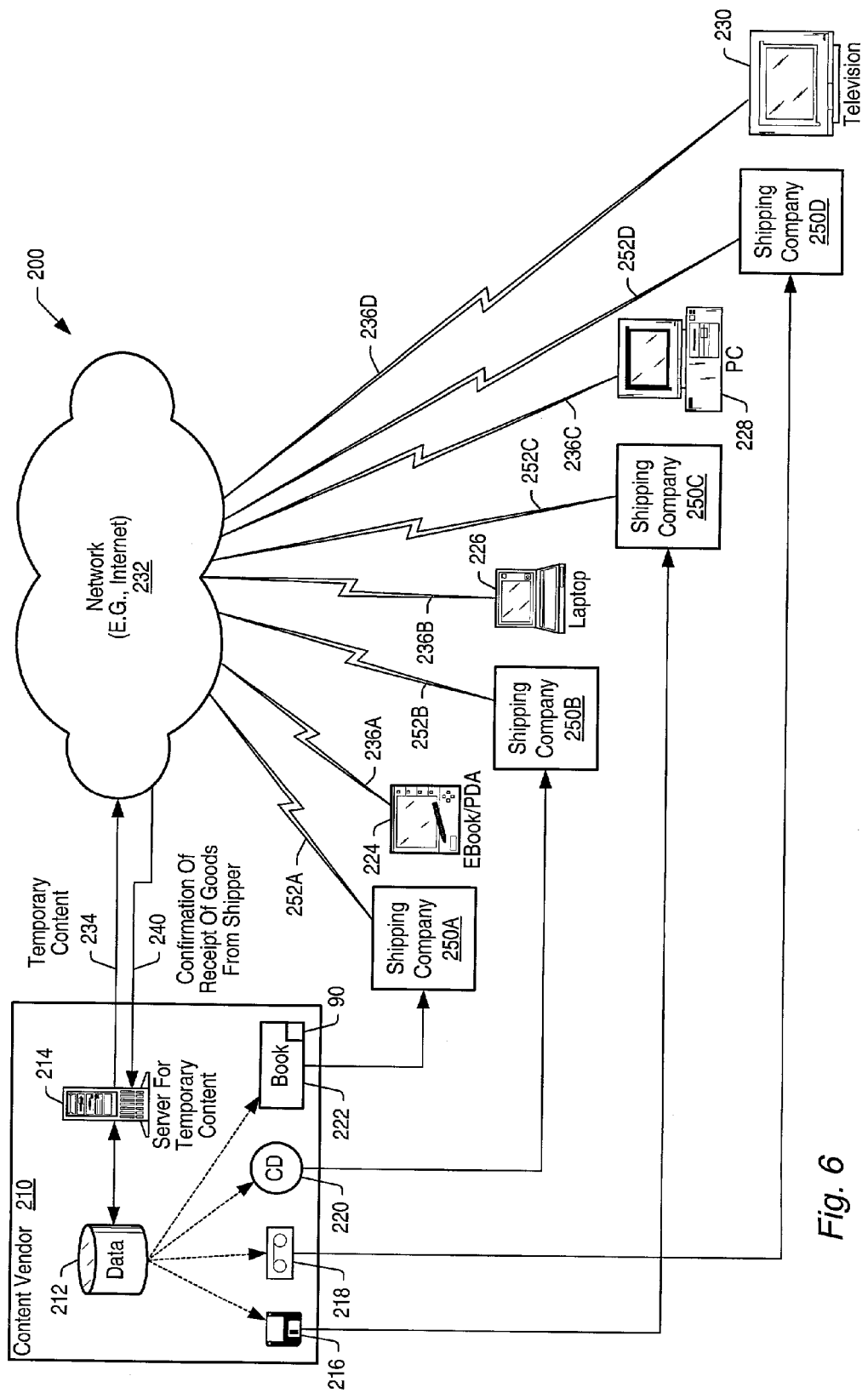
FIG. 6 is a diagram depicting another embodiment of a system for providing a customer with temporary access to content.

Turning now to FIG. 6, another embodiment of system 200 for providing temporary access to content is shown. In this embodiment, temporary content server 214 is configured to rely upon one or more shipping companies 250A through D in order to receive confirmation that the shipped goods have been received by the end consumer. As shown in the figure, each shipping company is configured with an electronic communications device as configured to access network 232 using wireless connections 252A through 252D. As shown on the figure, server 214 may be configured to receive communications from the shipping company's communications devices via network 232 (shown in the figure as communication 240). As described above, this communication may come from a shipping company's server (not shown) that is connected to network 232 as queried by content server 214.

Figure 7A:
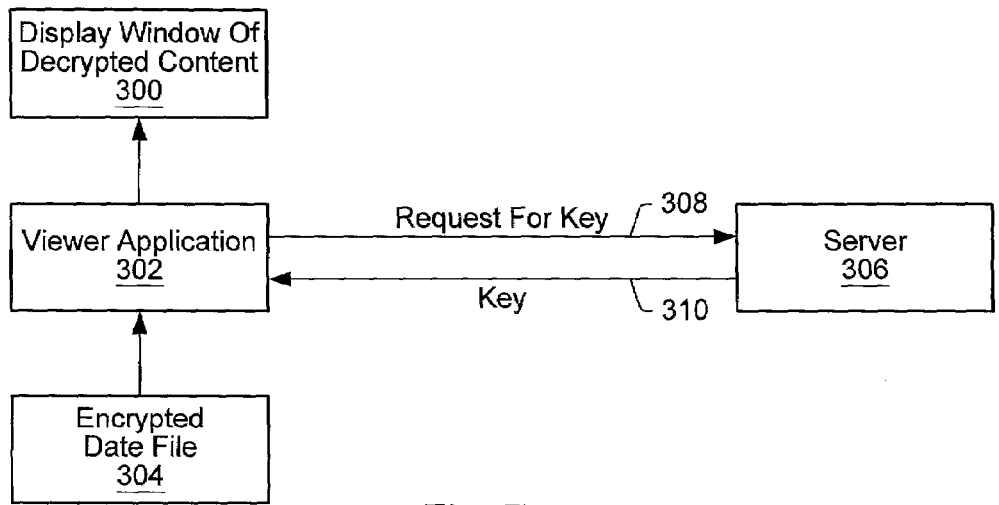
FIGS. 7A–7B are diagrams depicting different embodiments of systems for providing customers with temporary access to content.

Turning now to FIG. 7A, one embodiment of a system for insuring that the temporary content is only accessible while the ordered goods are being shipped is shown. In this embodiment, a viewer application 302 is used to decrypt an encrypted data file 304 that contains the temporary content. Viewer application 302 is configured to decrypt the encrypted content and display it for the customer (or play it for the customer in the event of audio temporary content). As shown in the figure, a display window may be used to show the decrypted content 300.

In some embodiments, viewer application 302 may be configured to submit requests for a decryption key 308 to server 306. In response thereto, server 306 may be configured to provide viewer application 302 with a temporary key 310 usable to decrypt the encrypted content. In one embodiment, each temporary key 310 is good for one use only. For example, viewer application 302 may be configured to re-encrypt any decrypted data from data file 304 into a new version of data file 304 using a new encryption that requires a new key from server 306 to access. Advantageously, server 306 may be configured to communicate with a shipping company server in order to determine whether shipped goods have been received by the customer and therefore make a correct determination as to whether temporary key 310 should issued or not.

Figure 7B:
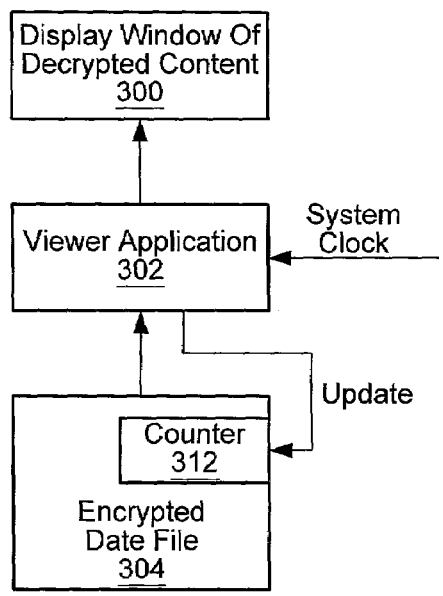

Turning now to FIG. 7B, another embodiment of a system configured to insure that only temporary access to content is provided is shown. In this embodiment, viewer application 302 may be configured to rely upon the system clock in order to determine whether or not the data file 304 should be decrypted and displayed in window 300. As shown in the figure, a counter 312 may be stored within encrypted data file 304 by viewer application 302. The counter may be updated by viewer application 302 to reflect the amount of time that has passed since the encrypted data file 304 is first accessed. This embodiment advantageously may limit access to the temporary content without the need for accessing a remote server (e.g., server 306 from FIG. 7A). In one embodiment, the initial value for counter 312 may be based on the projected shipping times for the item ordered.

FIG. 8: Example of Network

Figure 8A:
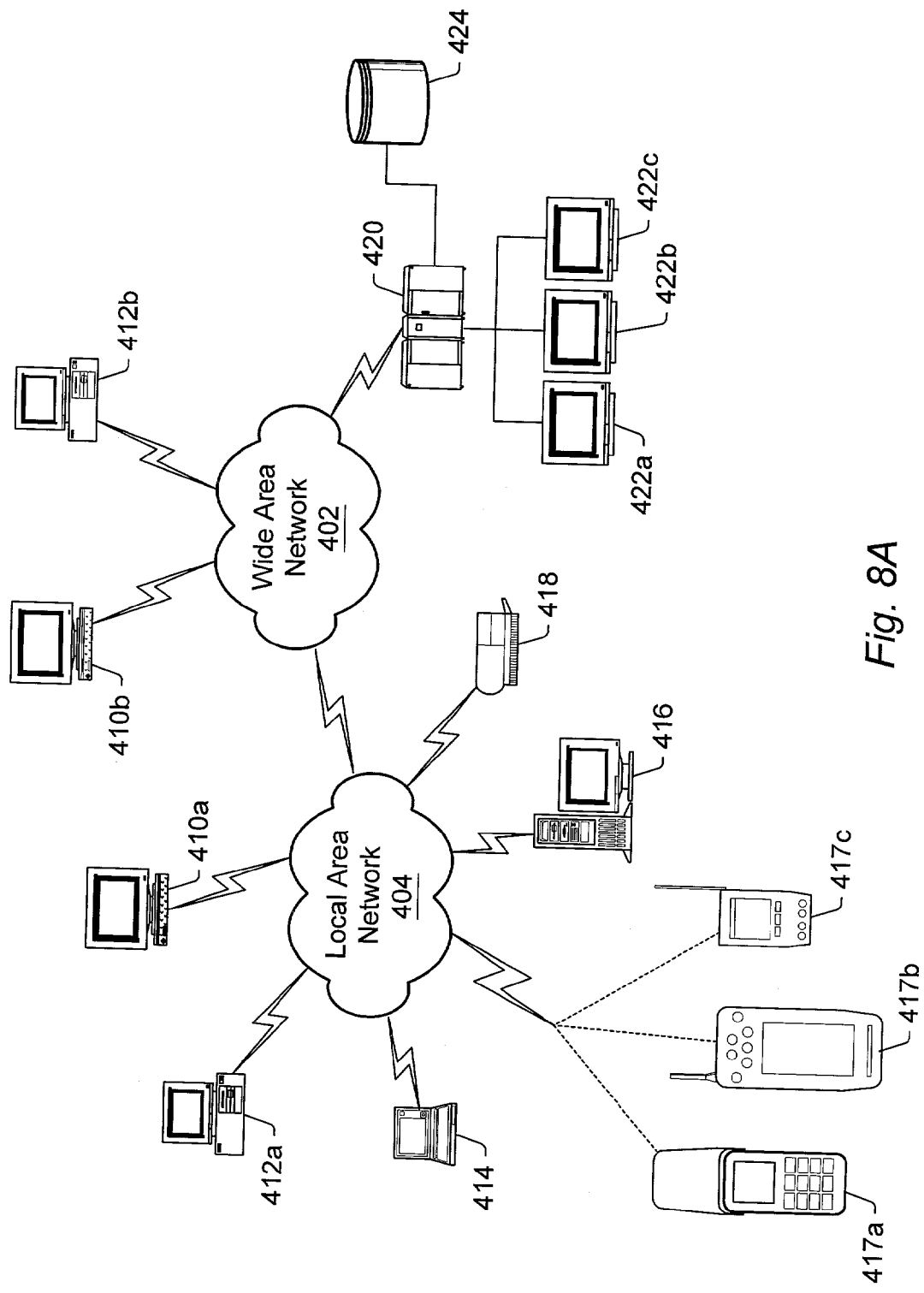
FIGS. 8A–C illustrates details of one embodiment of a network that may be used to implement the system of FIG. 5.
Figure 8B:
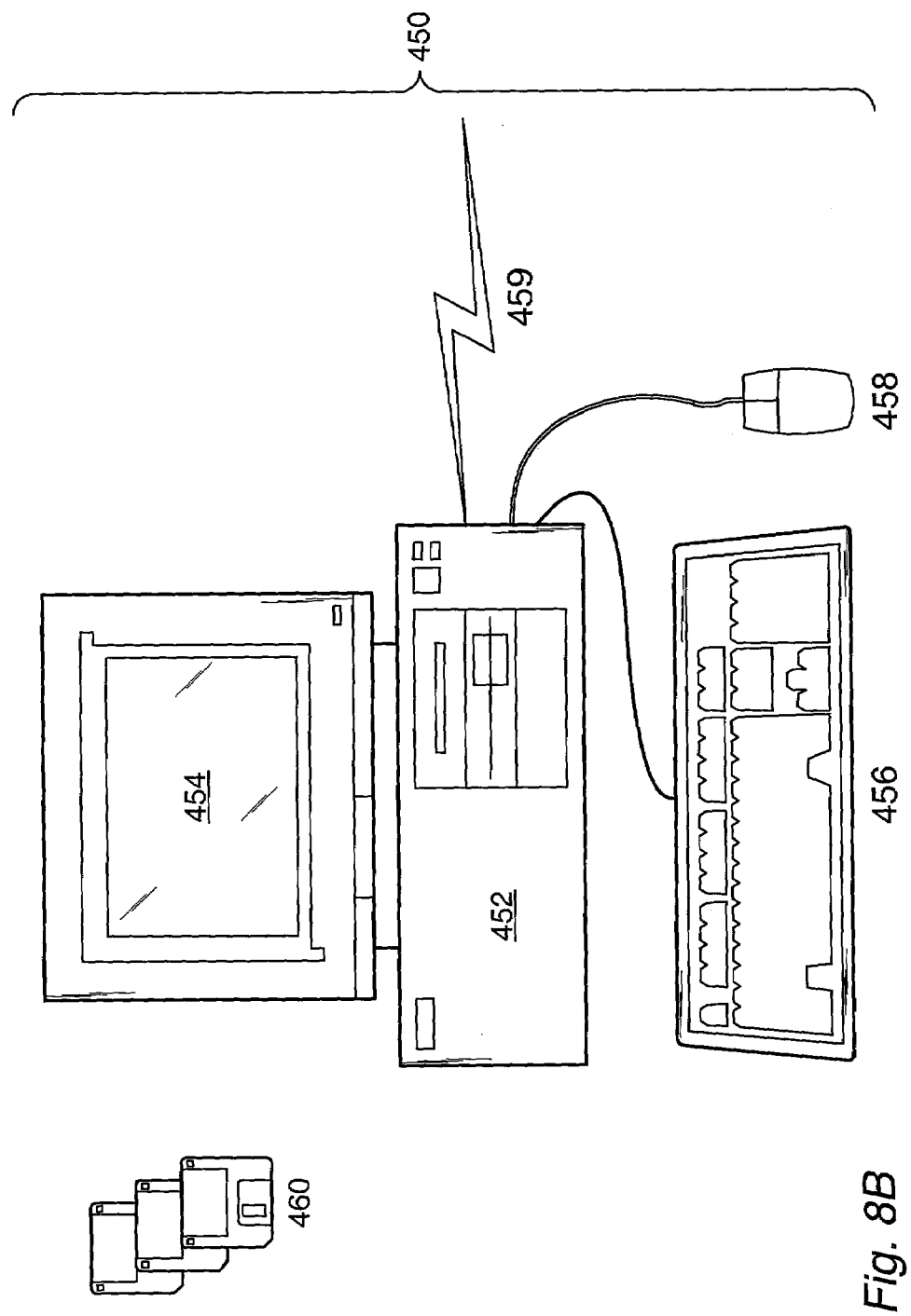
Figure 8C:
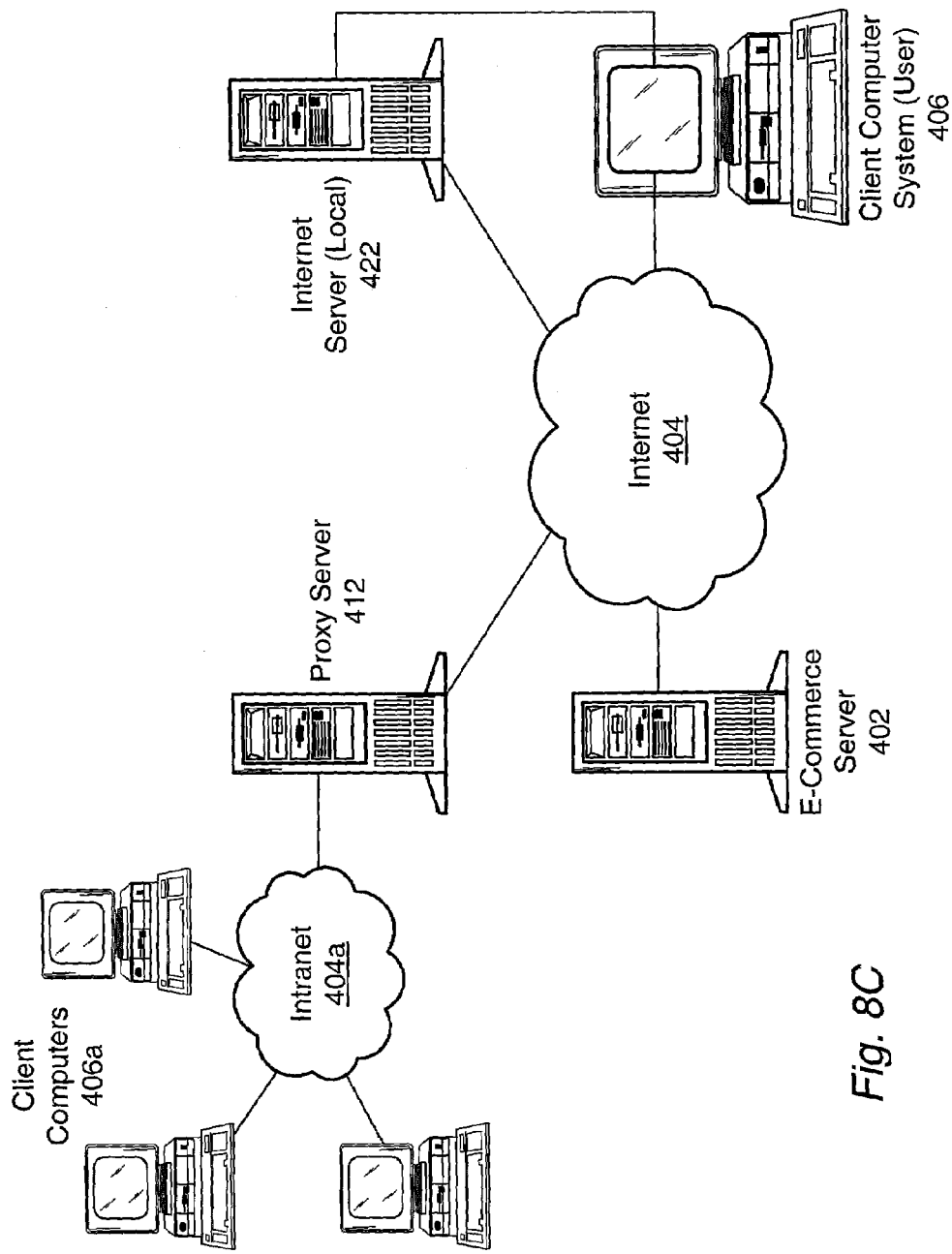

FIGS. 8A–C illustrates one embodiment of a network that may be used to implement the system of FIG. 5. Network 402 is a network that spans a relatively large geographical area. The Internet is an example of WAN 402. WAN 402 typically includes a plurality of computer systems which are interconnected through one or more networks. Although one particular configuration is shown, WAN 402 may include a variety of heterogeneous computer systems and networks which are interconnected in a variety of ways and which run a variety of software applications.

One or more local area networks (LANs) 404 may be coupled to WAN 402. A LAN 404 is a network that spans a relatively small area. Typically, a LAN 404 is confined to a single building or group of buildings. Each node (i.e., individual computer system or device) on a LAN 404 preferably has its own CPU with which it executes programs, and each node is also able to access data and devices anywhere on the LAN 404. The LAN 404 thus allows many users to share devices (e.g., printers) as well as data stored on file servers. The LAN 404 may be characterized by any of a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, radio waves).

Each LAN 404 includes a plurality of interconnected computer systems and optionally one or more other devices: for example, one or more workstations 410a, one or more personal computers 412a, one or more laptop or notebook computer systems 414, one or more server computer systems 416, wireless access devices 417 (e.g., web-enabled cell phones or personal digital assistants) and one or more network printers 418. As illustrated in FIG. 8A, an example LAN 404 may include one of each of computer systems 410a, 412a, 414, and 416, and one printer 418. The LAN 404 may be coupled to other computer systems and/or other devices and/or other LANs 404 through WAN 402. Private communication networks, often referred to as an Intranet 304a, may include one or more LAN's 404 and one or more WAN's 402.

One or more mainframe computer systems 420 may be coupled to WAN 402. As shown, the mainframe 420 may be coupled to a storage device or file server 424 and mainframe terminals 422a, 422b, and 422c. The mainframe terminals 422a, 422b, and 422c may access data stored in the storage device or file server 424 coupled to or included in the mainframe computer system 420.

WAN 402 may also include computer systems, which are connected to WAN 402 individually and not through a LAN 404: as illustrated, for purposes of example, a workstation 410b and a personal computer 412b. For example, WAN 402 may include computer systems, which are geographically remote and connected to each other through the Internet or the Intranet.

As shown in FIG. 8B, a typical computer system 450 suitable for implementing various embodiments of the system and method described herein may include components such as a CPU 452 with an associated memory medium such as floppy disks 460, CD-ROM (not shown), etc. The memory medium may store program instructions for computer programs, wherein the program instructions are executable by the CPU 452. The computer system 450 may further include a display device such as a monitor 454, an alphanumeric input device such as a keyboard 456, communication device such as a modem 459 and a directional input device such as a mouse 458.

As shown in FIG. 8C, the computer system 450 may be a client computer 406, operable by a computer user, to execute the computer programs to identify distinctive computer users accessing a web site as described herein. In another embodiment, the computer system 450 may be an e-commerce server 402 operable to execute the computer programs to identify distinctive computer users accessing a web site as described herein. Other embodiments of the computer system 450 may include, but are not limited to, a proxy server 412, a local Internet server 422, a mainframe computer, a personal computer, and several others as described herein.

The computer system 450 preferably includes a memory medium on which computer programs according to various embodiments may be stored. The term "memory medium" is intended to include an installation medium, e.g., a CD-ROM, or floppy disks 460, a computer system memory such as DRAM, SRAM, EDO RAM, Rambus RAM, etc., or a non-volatile memory such as a magnetic media, e.g., a hard drive, or optical storage. The memory medium may include other types of memory as well, or combinations thereof. In addition, the memory medium may be located in a first computer in which the programs are executed, or may be located in a second different computer that connects to the first computer over a network. In the latter instance, the second computer provides the program instructions to the first computer for execution. The computer system 450 may also include a time keeping device such as a real-time clock. The real-time clock of the computer system 450 may be, periodically or on demand, synchronized with a global standard time clock. Also, the computer system 450 may take various forms, including but not limited to a personal computer system, mainframe computer system, workstation, network appliance, Internet appliance, personal digital assistant (PDA), Internet enabled PDA, web television system, Internet enabled cellular telephone or any other similar device. In general, the term "computer system" can be broadly defined to encompass any device having a processor that executes instructions from a memory medium.

The memory medium preferably stores a software program or programs for identifying distinctive computer users accessing a web site as described herein. The software program(s) may be implemented in any of various ways, including procedure-based techniques, component-based techniques, and/or object-oriented techniques, among others. For example, the software program may be implemented using ActiveX® controls, programming languages such as C++, Java®, Visual Basic®, etc., object oriented software based on COM/DCOM and/or CORBA objects, JavaBeans, Microsoft Foundation Classes (MFC), browser-based applications (e.g., Java applets), traditional programs, or other technologies or methodologies, as desired. A CPU, such as the host CPU 452, executing code and data from the memory medium includes a means for creating and executing the software program or programs according to the methods and/or block diagrams described below.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

Trademarks

UPS, United Parcel Service, and UPS Online are registered trademarks of United Parcel Service of America, Inc.; amazon.com is a registered trademark of Amazon.com, Inc.; RealPlayer is a registered trademark of RealNetwork, Inc.; QuickTime is a registered trademark of Apple Computer, Inc.; Java is a registered trademark of Sun Microsystems, Inc.; ActiveX and Visual Basic are registered trademarks of Microsoft Corporation.

What is claimed is:

1. A method, comprising:
   in response to detecting that a user has purchased a content item via a computer network:
      providing the user with temporary online access to an online copy of the content item; and
      shipping a physical copy of the content item to the user; and
   deactivating the user's access to the online copy of the content item in response to detecting that the user has received the physical copy of the content item.

2. The method of claim 1, wherein said detecting that the user has received the physical copy is performed by periodically querying an Internet website providing package tracking information.

3. The method of claim 1, wherein said providing includes issuing the user a password, wherein the password is usable to access a data file for the content item on a server connected to the Internet.

4. The method of claim 3, wherein said deactivating includes deactivating the password issued to the user.

5. The method of claim 3, wherein the password must be reactivated by the user on a daily basis.

6. The method of claim 3, wherein the password is only valid for a predetermined amount of time.

7. The method of claim 1, further comprising providing a retail Internet site through which the user may purchase the content item.

8. The method of claim 1, further comprising:
   requiring the user to register the content item via the Internet, wherein said detecting that the user has received the physical copy is performed by detecting the user's registration.

9. The method of claim 1, wherein the content item is a book, and wherein the online copy is a text file of at least a portion of the book.

10. The method of claim 1, wherein the content item is a book, and wherein the online copy is an image file of at least a portion of the book.

11. The method of claim 1, wherein the content item is a compact disk, and wherein the online copy is an mp3 file of one or more of the songs on the compact disk.

12. The method of claim 11, wherein the mp3 file has a lower audio quality than the compact disk.

13. The method of claim 1, wherein the content item is a compact disk, and wherein the online copy is a streaming audio file of one or more of the songs on the compact disk.

14. The method of claim 1, wherein the content item is a video tape, and wherein the online copy is a streaming video file.

15. The method of claim 1, wherein the content item is a DVD, and wherein the online copy is a streaming video file.

16. The method of claim 1, wherein the content item is a video tape, and wherein the online copy is a digital movie file, wherein the digital movie file has a lower resolution than the video tape.

17. The method of claim 1, wherein the content item is a DVD, and wherein the online copy is a digital movie file, wherein the digital movie file has a lower resolution than the DVD.

18. The method of claim 1, wherein said detecting that the user has received the physical copy is performed by communicating with an electronic stamp affixed to or packaged with the physical copy of the content item.

19. A computer-readable medium comprising a computer program stored thereon, wherein the computer program is computer-executable to:
 in response to detecting that a user has purchased a content item via a computer network:
  provide the user with temporary online access to an online copy of the content item; and
  detect that the user has received a physical copy of the content item; and
 deactivate the user's access to the online copy of the content item in response to detecting that the user has received the physical copy of the content item.

20. The computer program of claim 19, wherein to detect that the user has received the physical copy, the program is further configured to periodically query an Internet website providing package tracking information.

21. The computer program of claim 19, wherein to provide the user with temporary online access to the online copy, the program is further configured to issue the user a password, wherein the password is usable to access a data file for the content item on a server connected to the Internet.

22. The computer program of claim 19, wherein the program is further configured to communicate with an electronic stamp affixed to or packaged with the physical copy of the content item to determine whether or not the user has received the physical copy of the content item.

23. A system for providing temporary access to content during shipping, the system comprising:
 a retail web site configured to allow a user to purchase one or more content items via the Internet;
 a temporary content server storing digital copies of at least a portion of each of at least a subset of the one or more content items; and
 a network interface connecting the temporary content server to the Internet, wherein the temporary content server is configured to provide the user with temporary access to selected portions of the stored digital copies, wherein the selected portions correspond to the one or more content items purchased by the user, wherein the temporary content server is configured to prevent the user from accessing the stored digital copies in response to detecting that the user has received a physical copy of the one or more content items purchased by the user.

24. The system of claim 23, wherein the temporary content server is configured to detect that the user has received the physical copy of the one or more purchased content items by querying an Internet website providing package tracking information.

25. The system of claim 23, wherein the retail web site is configured to issue the user a password, wherein the password is need to access the temporary content server.

26. The system of claim 25, wherein the temporary content server is configured to deactivate the password issued to the user.

27. The system of claim 25, wherein the password is only active for one day, and wherein the temporary server is configured to provide the user a new password on a daily basis until the user receives the physical copy of the one or more purchased content items.

28. The system of claim 25, wherein the password is only active for a predetermined amount of time.

29. The system of claim 25, further comprising a registration web page, wherein the physical copy of the one or more purchased content items requires the user to register with the registration web page.

30. The system of claim 29, wherein the temporary content server is configured to detect that the user has received the physical copy of the one or more purchased items by detecting the registration of the user with the registration web page.

31. The system of claim 23, wherein the content item is a book, and wherein the digital copy is a text file of at least a portion of the book.

32. The system of claim 23, wherein the content item is a book, and wherein the digital copy is an image file of at least a portion of the book.

33. The system of claim 23, wherein the content item is a compact disk, and wherein the digital copy is an mp3 file of one or more of the songs on the compact disk.

34. The system of claim 33, wherein the mp3 file has a lower audio quality than the compact disk.

35. The system of claim 23, wherein the content item is a compact disk, and wherein the digital copy is a streaming audio file of one or more of the songs on the compact disk.

36. The system of claim 23, wherein the content item is a video tape, and wherein the digital copy is a streaming video file.

37. The system of claim 23, wherein the content item is a DVD, and wherein the digital copy is a streaming video file.

38. The system of claim 23, wherein the content item is a video tape, and wherein the digital copy is a digital movie file, wherein the digital movie file has a lower resolution than the video tape.

39. The system of claim 23, wherein the content item is a DVD, and wherein the digital copy is a digital movie file, wherein the digital movie file has a lower resolution than the video tape.

40. The system of claim 23, further comprising an electronic stamp affixed to or packaged with the physical copy of the one or more purchased content items wherein the electronic stamp is configured to communicate to the temporary content server a indication that the user has received the physical copy of the one or more purchased content items.

41. A system for providing temporary access to content during shipping, the system comprising:
 a means for selling content items to a user over a network;
 a means for storing digital copies of at least a portion of at least a subset of the one or more content items;
 a means for providing the user temporary access to the stored digital copies corresponding to content items purchased by the user; and
 a means for preventing the user from accessing the stored digital copies once the user has received a physical copy of the one or more content items purchased by the user.

* * * * *